United States Patent [19]
Clark et al.

[11] Patent Number: 5,603,900
[45] Date of Patent: Feb. 18, 1997

[54] VACUUM FILTER DEVICE

[75] Inventors: Phillip Clark, Wakefield; Brian D. Foley, Westford; Aldo M. Pitt, Wayland, all of Mass.

[73] Assignee: Millipore Investment Holdings Limited, Wilmington, Del.

[21] Appl. No.: 444,493

[22] Filed: May 19, 1995

[51] Int. Cl.$^6$ ............................ B01D 63/00; B01L 11/00
[52] U.S. Cl. ........................ 422/101; 422/100; 422/102; 422/103; 422/104; 210/321.75; 210/321.84; 210/406; 210/416.1; 210/455; 604/406
[58] Field of Search .................................. 422/100, 101, 422/102, 103, 104; 210/416.1, 436, 455, 466, 472, 473, 406, 321.75, 321.84; 604/406

[56] References Cited

U.S. PATENT DOCUMENTS

| | | | |
|---|---|---|---|
| 3,844,895 | 10/1974 | Rose et al. | 210/436 X |
| 4,301,010 | 11/1981 | Eddleman et al. | 210/406 |
| 4,357,240 | 11/1982 | Mehra et al. | 210/455 |
| 4,673,501 | 6/1987 | Wells et al. | 210/406 |
| 4,783,318 | 11/1988 | Lapakko | 422/101 |
| 4,849,061 | 7/1989 | Relyea | 156/308.4 |
| 5,141,639 | 8/1992 | Kraus et al. | 210/321.75 |
| 5,234,585 | 8/1993 | Zuk | 210/188 |
| 5,238,655 | 8/1993 | Laible et al. | 422/101 |
| 5,264,184 | 11/1993 | Aysta et al. | 422/101 |
| 5,468,388 | 11/1995 | Goddard et al. | 210/321.75 |

FOREIGN PATENT DOCUMENTS

WO9310433  5/1993  WIPO.

*Primary Examiner*—Harold Pyon
*Attorney, Agent, or Firm*—Andrew T. Karnakis

[57] ABSTRACT

A vacuum filter device is disclosed which includes a filter body which is adapted to receive in fluid-tight, sealed relationship a pair of closed containers for solutions to be filtered by a membrane filter positioned within the filter body. A vacuum port in the filter body communicates with the downstream side of the membrane and a venting passageway also located in the filter body communicates with the closed sample container to serve as a vent to atmospheric pressure. The venting passageway is made of an air permeable hydrophobic filter or preferably a small enough opening to prevent the sample solutions from leaking out of the device during normal use.

17 Claims, 8 Drawing Sheets

(1) Insert forming tool at bonding interface

Ultrasonic Energy (2) Bond top holder to base holder

Ultrasonic Energy (3) Remove forming tool

VACUUM FILTER DEVICE

BACKGROUND OF THE INVENTION

The present invention generally relates to vacuum filter devices and particularly to such devices for filtering liquids from one container through a membrane and depositing the filtrate directly into another container. More particularly, the invention relates to a liquid-tight filtration system in which solutions, such as tissue culture anedia, are vacuum filtered.

Devices for filtering biological solutions generally involve three primary components, i.e. a membrane filter interposed between two vessels, a feed container located upstream of the membrane for holding the sample solution to be filtered and a filtrate container located downstream of the membrane filter for collecting the filtered sample solution. Often a vacuum is drawn downstream of the membrane to increase the rate of filtration by creating a pressure differential across the filter. However, in such cases provisions must be made to maintain the pressure differential across the membrane and thus assuring that the filtration will not stop.

The arrangement of components for vacuum filtration can take various forms; however, especially in laboratory settings, ease of use, reduced storage requirements and minimal disposable hardware are important concerns as is avoiding spillage of the biological solution. In certain other applications, preserving the sterility of the solution being filtered is also important.

An example of a vacuum filter device is described in U.S. Pat. No. 4,673,501 wherein an open funnel for receiving a sample of solution to be filtered is arranged to be sealed to the top of a bottle for collecting filtrate. The base of the funnel includes a membrane filter positioned such that when the sample to be filtered is poured into the top of the funnel all of the sample solution is directed to flow through the membrane filter. A vacuum conduit which is adapted to be connected to a vacuum source is formed within the base of the funnel and allows a vacuum to be drawn within the filtrate bottle thereby drawing the sample solution through the membrane filter. Since the pressure differential across the filter is constant due to the application of a vacuum on the downstream side of the filter and atmospheric pressure present on the liquid surface of the open funnel, rapid filtration is possible and any reduction in flow rate is clue to filter fouling. Nonetheless, vacuum filter devices of the type described in this patent suffer from a number of drawbacks which make them inconvenient for laboratory use. First, these devices require the liquid sample be transferred from its normal laboratory container to an open funnel. Because of the liquid weight concentrated at the top of this assembly, they are prone to tipping and hence spilling the biological solution during pouring of sample or when connecting hoses. Aside from the inconvenience to the user in handling the fluid to be filtered, there is an enhanced risk of compromising the sterility of the particular biological solution due to the open nature of this device. Moreover, the large size of these filter assemblies results in their taking up limited laboratory storage space. In addition, since the containers utilized in the filtration process are disposable and intended for one-time use, a significant amount of solid waste is generated by these filter assemblies and the associated pre- and post- filtration containers.

To minimize the amount of solid waste and fluid transfers, U.S. Pat. No. 5,141,639 describes a vacuum filter assembly wherein the membrane filter is disposed in a cover sealable to the filtrate container. The cover is formed with a feed port in the form of a tubular feed nipple on the upstream side of the membrane filter. A length of tubing is connected at one end to the feed nipple and the other end is directly inserted into a sample container housing the solution to be filtered. The cover also includes a filtrate outlet port and a vacuum port, both of which fluidically connect with the downstream side of the membrane filter. When tubing is attached to the vacuum port and a vacuum is drawn the sample solution to be filtered is caused to flow through the tubing and pass through the membrane filter to the filtrate container. As is the case with the aforementioned U.S. Pat. No. 4,673,501, the pressure difference in this prior art assembly remains constant because of the vacuum in the filtrate container and the atmospheric pressure acting on the liquid surface in the open feed or sample container. While this device minimizes the amount of solid waste generated during filtration, it is cumbersome to use as the operator must assemble the tubing to the cover and hold the over on the filtrate container until the necessary vacuum pressure has been achieved in the filtrate container. Additionally, the feed tubing must be maintained submerged in the sample container to avoid air being drawn into the sample solution which could disrupt the filtration. In addition, the sample is housed in an open container; therefore, the risk of compromising sterility is heightened.

Thus it is apparent that the need still exists for an improved vacuum filter device that is easy to use, reduces the solid waste generated, minimizes the number of times the fluid is transferred and reduces the risk of liquid spillage.

SUMMARY OF THE INVENTION

The present invention overcomes the disadvantages and limitations of the prior art by providing a vacuum filter device for filtering solutions which includes a filter body having two junctions disposed on opposite sides of a filter. Each junction is adapted to receive a closed container in a fluid-tight, sealed relationship. Other aspects of the invention include provisions for forming a substantially liquid-tight filtration system and for reducing the risk of contaminating the sample solution to be filtered. The invention also minimizes the risk of spillage and contamination of the solution by eliminating fluid transfer between open containers. The device also includes a vacuum port communicating with the downstream side of the filter, and hence the filtrate container. When connected to a vacuum source, the pressure differential will allow a vacuum to draw the sample solution from the sample container through the filter and into the filtrate container. To maintain the pressure differential necessary to continue the flow of sample, a passageway communicates with the upstream side of the membrane, and hence the sample container, to provide a vent to atmospheric pressure.

In accordance with a preferred embodiment of the invention, two identical laboratory containers, for example centrifuge tubes, are screwed onto opposite sides of a filter body. The filter body has two mating threaded recesses disposed along the central axis of the body, with each recess having a raised annular ring for creating a fluid-tight seal with the top of the container when it is screwed into the body. The portion of the filter body between the two recesses includes a membrane filter bonded to a suitable support. Two passageways formed in the filter body communicate fluidically with the opposite sides of the membrane and ultimately with each of the containers. One of the passageways is a vacuum port which communicates with the downstream side of the membrane and is adapted to be connected to a vacuum source for enabling sample to be drawn through the membrane filter and be collected as filtrate. The other passageway communicates with the upstream side of the membrane (and the sample container) and serves as a vent to atmospheric pressure.

When a sample solution is placed in the sample container and both the sample container and an empty filtrate container are secured to the filter body, a vacuum is applied to the vacuum port to create a pressure differential between the two containers. This pressure differential causes sample fluid to pass through the membrane filter from the sample container to the filtrate container. As the volume of fluid in the sample container is reduced, air enters through the venting passageway to maintain the pressure differential across the membrane so that filtration continues uninterrupted until all the ample is filtered.

In accordance with one aspect of the invention particularly suitable for applications where leaking of the solution is of concern, the venting passageway is less than 0.015 inches in its smallest dimension. This passageway is made by inserting a forming tool between the two halves of the filter body prior to the integral joining process. Once the two halves have been joined, the forming tool is removed and a passageway between the halves of the body is formed having dimensions corresponding to that of the forming tool. The creation of such a small dimension passageway, heretofore unattainable through conventional molding and assembly techniques, allows it to be used in the filter device of the present invention as a venting passageway without incorporating any other structure such as a membrane covering the passageway to prevent solution from leaking out of the filtration system during normal use. For purposes herein normal use includes transporting containers within the laboratory and tipping containers either during use or while being transported.

In certain applications, the liquid-tight feature of the above mentioned small dimension passageway is enhanced by decreasing the surface energy of the passageway. This may be achieved by either inserting a hydrophobic liner into the passageway or applying a hydrophobic surface treatment to all or a portion of the internal surfaces of the passageway.

These and other aspects and advantages of the invention will become apparent from the following detailed description taken in conjunction with the drawings.

DETAILED DESCRIPTION OF PREFERRED EMBODIMENTS

Figure 1:
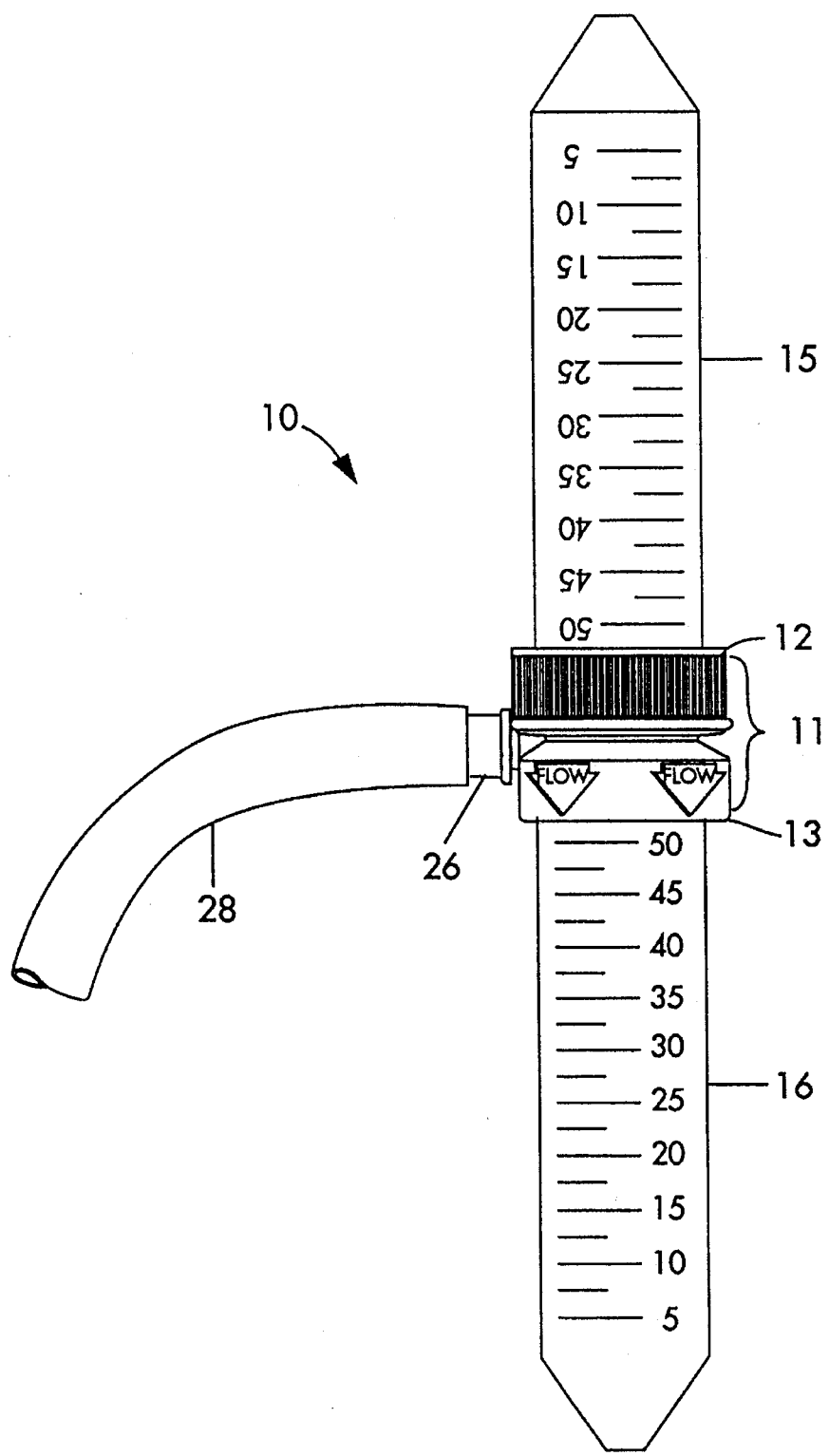
FIG. 1 is a front elevation view of a preferred embodiment of a vacuum filter device with laboratory containers coupled thereto in accordance with the invention.
Figure 3:
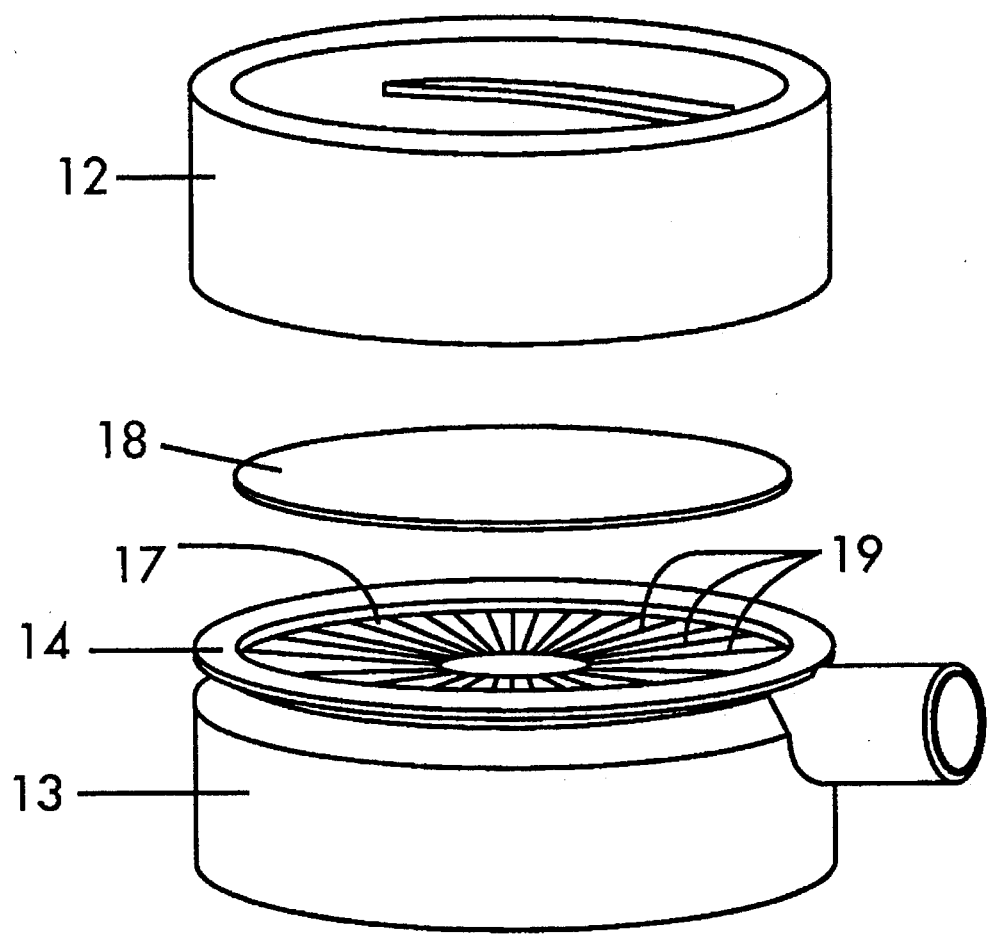
FIG. 3 is an exploded view of the filter body illustrating the assembly of the membrane filter.

FIG. 1 shows a vacuum filter device 10 which includes a filter body generally indicated by numeral 11 having a pair of axially disposed tubular holders 12, 13 each having a threaded open end. The holders are bonded back-to-back (see also FIG. 3) at interface 14 by any suitable welding technique such as ultrasonic welding to form an integral body. The open end of the holders serve as a junction to accept a closed sample container 15 for a biological fluid such as tissue culture media to be filtered and a closed filtrate container 16 for collecting the filtered sample (filtrate).

The holder 13 includes a face plate 17 with a series of radially extending ribs 19 molded on the top surface of the plate which act as a support for a porous membrane 18 which is welded at its periphery to the plate 17 prior to bonding the two holders together. For applications involving the sterile filtration of tissue culture media, a particularly suitable microporous membrane is a 0.22 micron polyethersulfone membrane available from Millipore Corporation under the brand name Express™. However, depending on the filtration application, the membrane may be made from any other suitable polymeric materials such as mixed esters of cellulose, cellulose acetate, polycarbonate, polyvinylidene fluoride, polytetrafluoroethylene, nylon, polypropylene, polyethylene or the like. The use of inorganic materials is also possible as well as filter structures that are not microporous (e.g. depth filters). In some applications, a combination of filters may provide improved performance. For example, for particularly dirty samples a depth filter 80 (see FIG. 8) which functions as a prefilter matrix in combination with a microporous membrane filter can be used.

Figure 2:
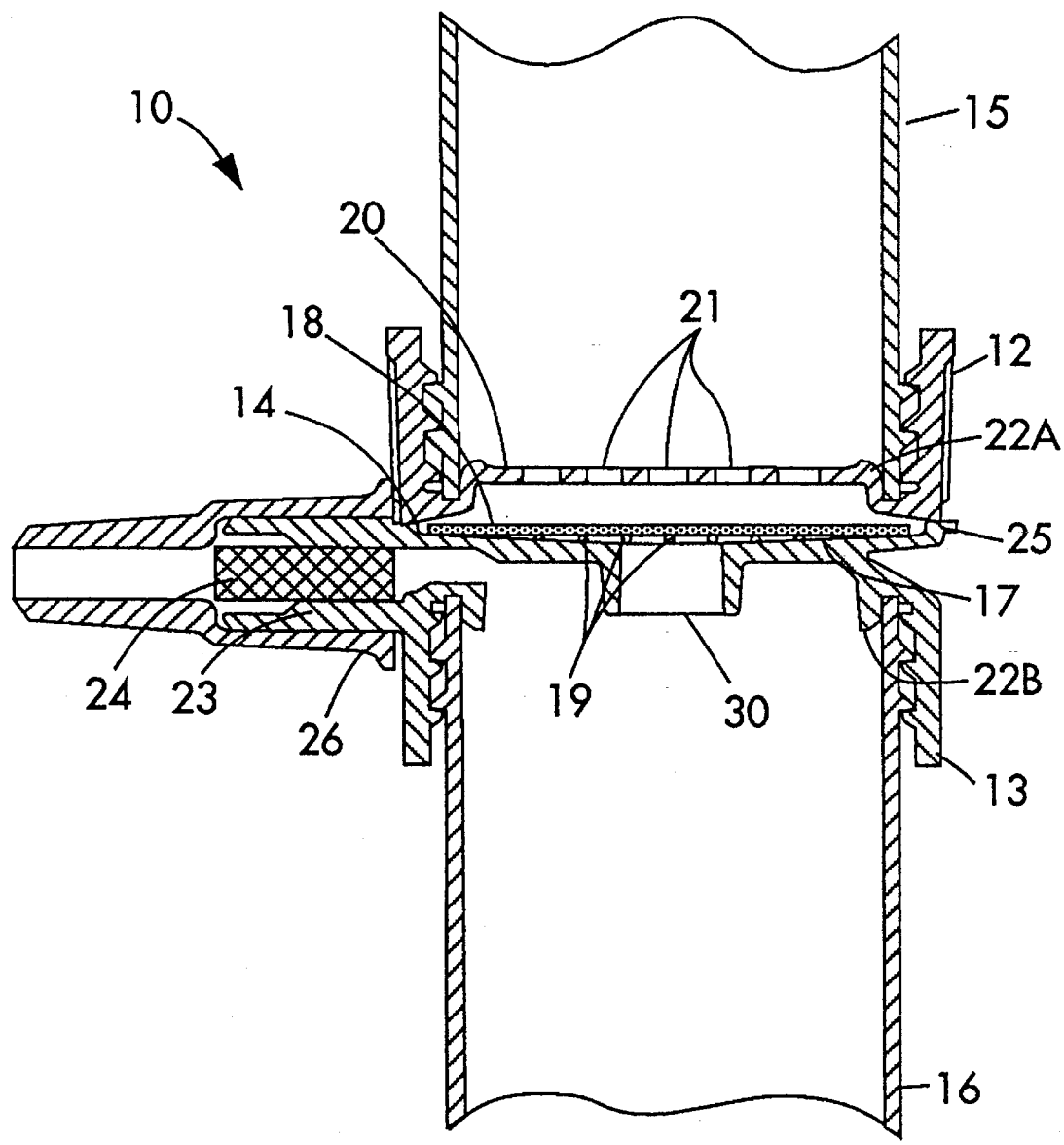
FIG. 2 is a detailed sectional view of the filter body of the device of FIG. 1.

Referring also to FIG. 2, the bottom of the holder 12 which abuts the face plate 17 includes a membrane guard 20 formed as part of the holder. The guard is wagon-wheeled shaped such that when the two holders 12, 13 are bonded together sample solution can flow through a series of openings 21 and then be filtered by the membrane 18. A passageway 30 provides the fluid communication link between the downstream side of the membrane 18 and the filtrate container 16.

The filter body 11 has respective raised annular rings 22A, 22B which are molded within each of the holders 12, 13 near to their periphery. A vacuum port 23 in communication with the downstream side of the membrane 18 includes a filter matrix 24 within the central bore of the port 23. The matrix 24 is used to prevent the migration of contaminants such as bacteria or oil residues from entering the filtrate during vacuum operation as well as to protect the vacuum system from being contaminated by the filtered sample. A tube adapter 26 is secured to the vacuum port. A venting passageway 25, the details of which are best shown in FIGS. 4A and 4B, is formed at the interface 14 of the two holders and is in fluid communication with the upstream side of the membrane and provides a vent for the sample container 15.

The inclusion of the venting passageway 25 is important to the proper operation of the vacuum filter device 10 because the sample container 15 is a closed vessel and the overall filter device is of liquid-tight construction. The venting passageway allows for maintaining the necessary pressure differential across the filter, a feature attributed to the previously described prior art because of the open nature of their feed containers at a sacrifice of the benefits of the liquid-tight system of the present embodiment, such as minimizing the risk of sic, ills and contamination. While a closed sample container would be able to start the filtration process, it would not provide commercially acceptable performance over the course of filtration. To explain, the closed sample container starts the filtration process with an internal starting pressure at atmospheric pressure. As vacuum is applied to the vacuum port 23, the pressure differential ($\Delta P$) across the membrane is defined by $\Delta P = (P_{sample} - P_{filtrate})$ where $P_{sample}$ is the air pressure in the sample container and $P_{filtrate}$ is the air pressure in the filtrate container. Initially, $P_{sample} = P_{filtrate} = P_{atmosphere}$; however, as fluid is drawn through the membrane 18 to the filtrate container 16 the sample volume is being reduced. In a closed system, this reduction in the amount of sample in the sample container over time t1 to t2 translates to a reduction in pressure, as governed by the pressure/volume relationship ($P_{sample(t1)} V_{sample(t1)} = P_{sample(t2)} V_{sample(t2)}$) where $P_{sample}$ and $V_{sample}$ relate to the gas within the sample container. As the pressure in the sample container is reduced, the $\Delta P$ is lessened thereby slowing the flow rate. If allowed to continue $P_{sample}$ will equal $P_{filtrate}$ resulting in no flow. To insure the maximum $\Delta P$ and hence the greatest flow rate, the sample container needs to be maintained as close to $P_{atmosphere}$ as possible. With the present invention, this goal is achieved by the venting passageway connecting the sample container with the outside atmospheric pressure.

Figure 4A:
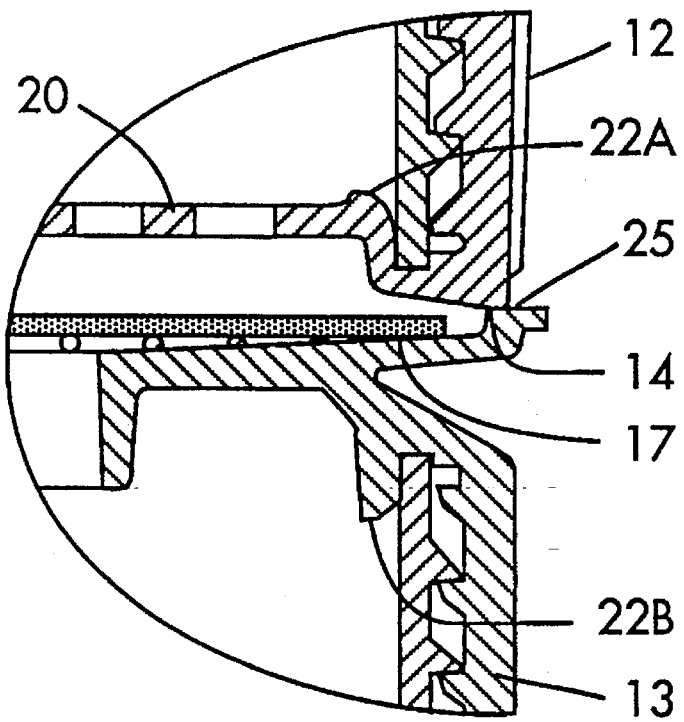
FIG. 4A is an enlarged sectional view of one embodiment of the venting passageway of the filter body of FIG. 2.
Figure 4B:
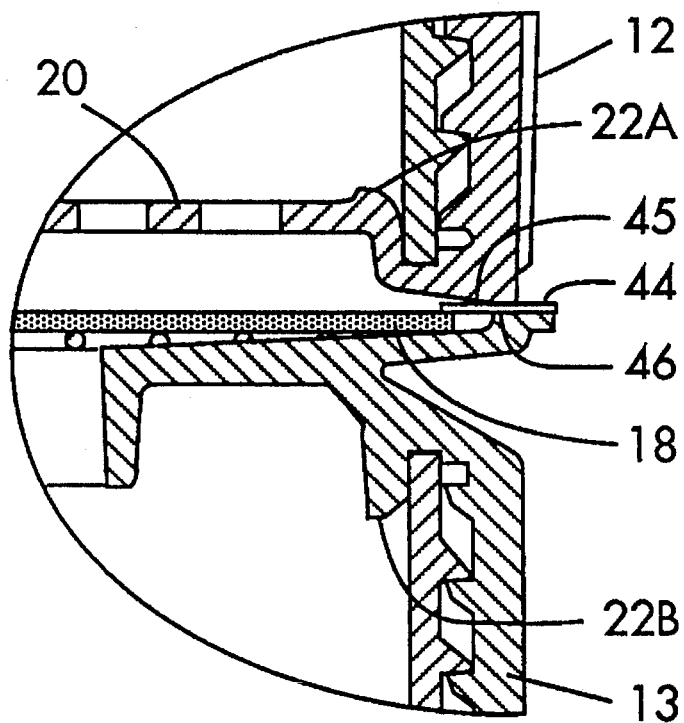
FIG. 4B is an enlarged sectional view of another embodiment of the venting passageway of the filter body of FIG. 2.
Figure 5A:
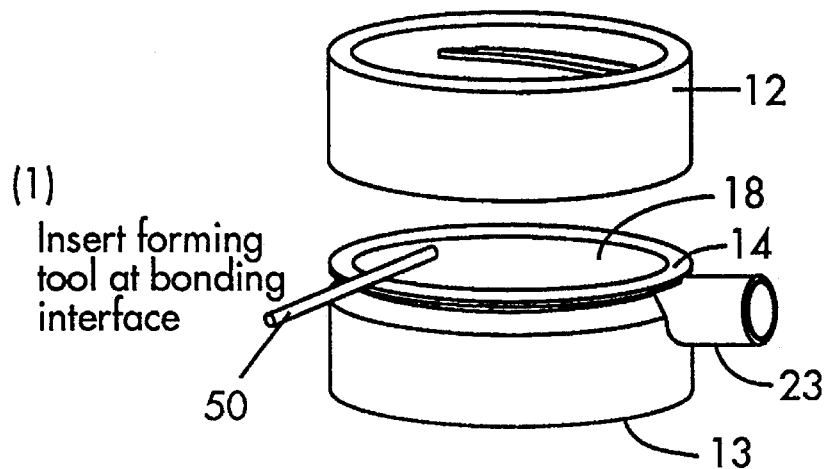
FIGS. 5A, B and C are a series of diagrammatic views illustrating the process of forming the venting passageway in the device of FIG. 1.
Figure 5B:
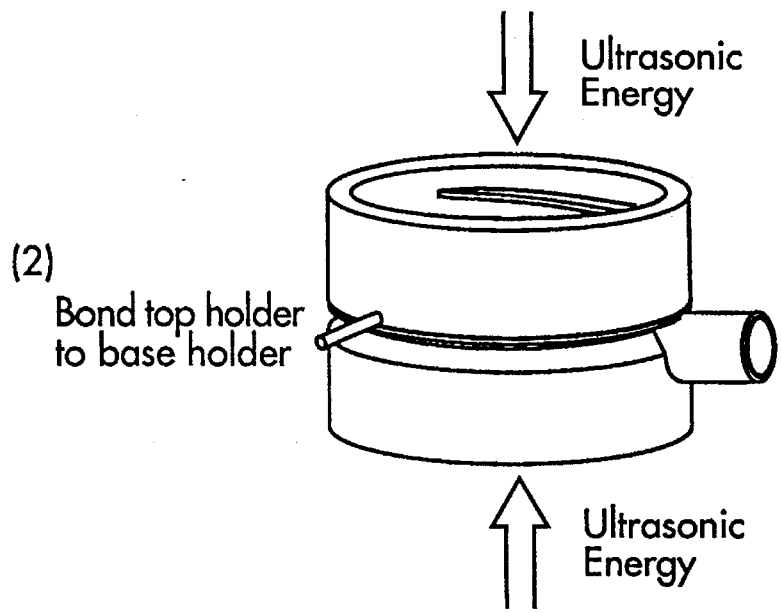
Figure 5C:
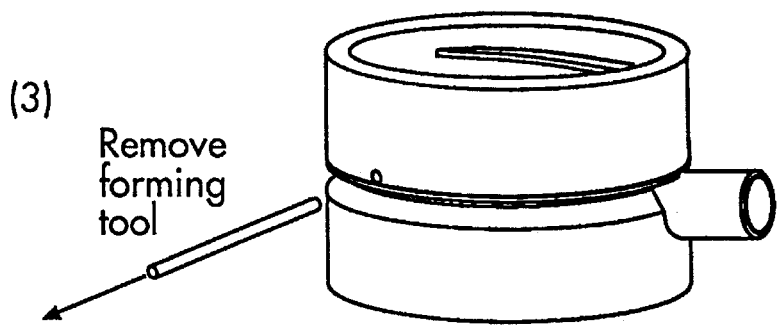

In accordance with an important aspect of the invention involving substantially liquid-tight filtration applications, the venting passageway as shown in FIG. 4A is formed in the filter body in a manner which creates a passageway whose smallest dimension is 0.015 inches or less. Details of the techniques used to create this small dimension passageway in the filter body 11 are best discussed with reference to FIGS. 5A, B and C. As discussed, the filter body is constructed by ultrasonically welding the two holders 12, 13 at the interface 14. As shown in FIG. 5A, a forming tool 50 is placed between the two holders prior to initiating the weld process. This tool can take a variety of shapes depending on the desired dimensions of the orifice. In this embodiment a circular wire of diameter 0.015 inches is used, although it will be understood that forms of rectangular cross-section or even other geometries may be employed. FIG. 5B shows the holders placed together with the forming tool in position as ultrasonic energy is applied. After the holders are welded together, the forming tool is removed leaving a through-hole whose dimensions correspond to that of the tool. To assist in the removal, the remote end of the forming tool can be slightly tapered such that as the minimum force required to begin disengaging the forming tool is applied the remainder of the tool will more readily be removed from the interface 14 between the two holders.

Injection molding methods generally provide the greatest dimensional control of shape with plastic parts. To apply conventional molding techniques in the present instance, it would be desirable to mold a passageway in the wall section of the filter body 11 remote from the joining surfaces of the two holders 12, 13 in order to eliminate the deformation of the passageway during assembly thereby retaining the dimensional control. However, conventional molding processing techniques would not allow a passageway that is molded into the wall of the holder 12 to be 0.015 inches or less. This is because as the molten plastic enters the mold cavity the pin used to create the passageway would deflect leading to fatigue and breakage. Also, for the pin to seal off against the other wall of the cavity, the sealing end of the pin will be peeled over in time leading to flashing. Flashing is an uncontrollable, undesirable migration of plastic, which in this example will lead to filling and dimensionally distorting the venting passageway 25.

If, instead of molding a passageway in the wall of the filter body 11 as discussed above, an attempt were made to mold an interruption or notch on the joining surfaces of the holders 12, 13 with dimensions of 0.015 inches or less, the joining process, whether it be vibrational, thermal or chemical, would distort or even close the passageway because the two surfaces are joined by softening and moving the plastic together followed by a stabilization period. The plastic that moves during joining will be squeezed into available areas, such as the void created by the molded in interruption. Also the direction of movement of the plastic during the joining process is not controllable. Thus as the plastic moves into the interruption it will dimensionally change the shape and possibly close the interruption altogether.

The use of a forming tool during the joining process provides for a dimensionally controlled geometry that is independent of the molding process and controllable with a variety of joining processes in addition to the ultrasonic welding process of the embodiment described, such as vibration bonding, radiant heat and other fusion bonding processes as well as solvent bonding.

The ability to form the venting passageway 25 with dimensions of 0.015 inches or less provides significant advantages in that the filtration device maintains its liquid-tight capabilities without employing an additional membrane covering the venting passageway to prevent solution from leaking out of the device during normal use.

In some applications where the solution to be filtered has low surface tension which allows the solution to readily wet surfaces, such as solutions containing surfactants, it may be advantageous to impart hydrophobic properties to all or a portion of the venting passageway 25. One way to maintain the liquid-tight attributes of the present invention in such applications is to decrease the surface energy of the passageway. FIG. 4B shows the inclusion of a hydrophobic liner 44 positioned in the venting passageway 25 which serves as a hydrophobic porous matrix. Preferred forms of this matrix include porous hollow fiber membranes, porous polymer rods or microbore tubing, all constructed from a suitable hydrophobic resin. To fabricate the filter body 11 with the liner 44, a molded slot of predetermined dimension and geometry sufficient to encapsulate the liner is formed in opposing surfaces 45, 46 of the respective holders 12, 13. The liner is then crimped in place without collapsing its lumen during the holder joining process to provide fluid communication between the sample container 15 and the outside atmospheric pressure. Use of a hydrophobic liner allows the materials of the filter body to be selected based on economics or specific material properties. As mentioned, the venting passageway need not be completely lined but only imparted with hydrophobic properties along a portion of the passageway.

Since the liquid-tight characteristic of the present invention is enhanced when the small dimension venting passage 25 described in accordance with the embodiment of FIG. 4A is utilized, this attribute may be further enhanced by applying a hydrophobic treatment to the surfaces of the passageway, preferably in liquid form during assembly of the FIG. 4A embodiment. A hydrophobic solution such as polytetrafluoroethylene (PTFE) in suspension may be applied to the forming tool 50 before the tool is inserted between the holders 12, 13. When the tool is removed after weld energy is applied, a film of the PTFE remains on the inner surfaces of the venting passageway. The hydrophobic liquid treatment decreases the surface energy and prevents leakage of the sample solution during normal laboratory use.

In operation, a sample solution to be filtered is deposited in the sample container 15 and is screwed tightly onto the holder 12 with the open end of the sample container being held upward until the upper lip of the sample container is squeezed against the angled surface of the ring 22A. Tightly screwing the container to the filter body 11 creates a fluid-tight seal. In similar fashion, the filtrate container 16 is screwed into the holder 13 against the angled surface of the ring 22B. Optionally, an elastomeric gasket 55 (see FIG. 8) may be positioned within the base of the holders 12, 13 to provide the necessary seal. For sterile filtration of tissue culture, the filtrate container and the filter body are pre-sterilized prior to coupling them together.

The device 10 is then flipped over such that the sample container 15 is oriented upward with respect to the filter body 11 as shown in FIG. 1. A length of tubing 28 is connected to a vacuum pump (not shown) and a vacuum is applied to port 23 and the filtrate container is evacuated of air and the pressure therein correspondingly reduced. The unfiltered sample solution is then passed from the higher pressure sample container 15 through the membrane guard 20 and the membrane 18. The filtered solution flows through the opening 30 and collects as filtrate in the filtrate container 16. To maintain the pressure differential, which serves as a driving force, air at atmospheric pressure enters through the venting passageway 25 and replaces the volume of sample solution that passes through the membrane. The dimensions of the venting passageway discussed with respect to the embodiment shown in FIG. 4A are so small that sample does not leak out from the sample container 15, thus preserving the liquid-tight nature of the filtration device.

Figure 6:
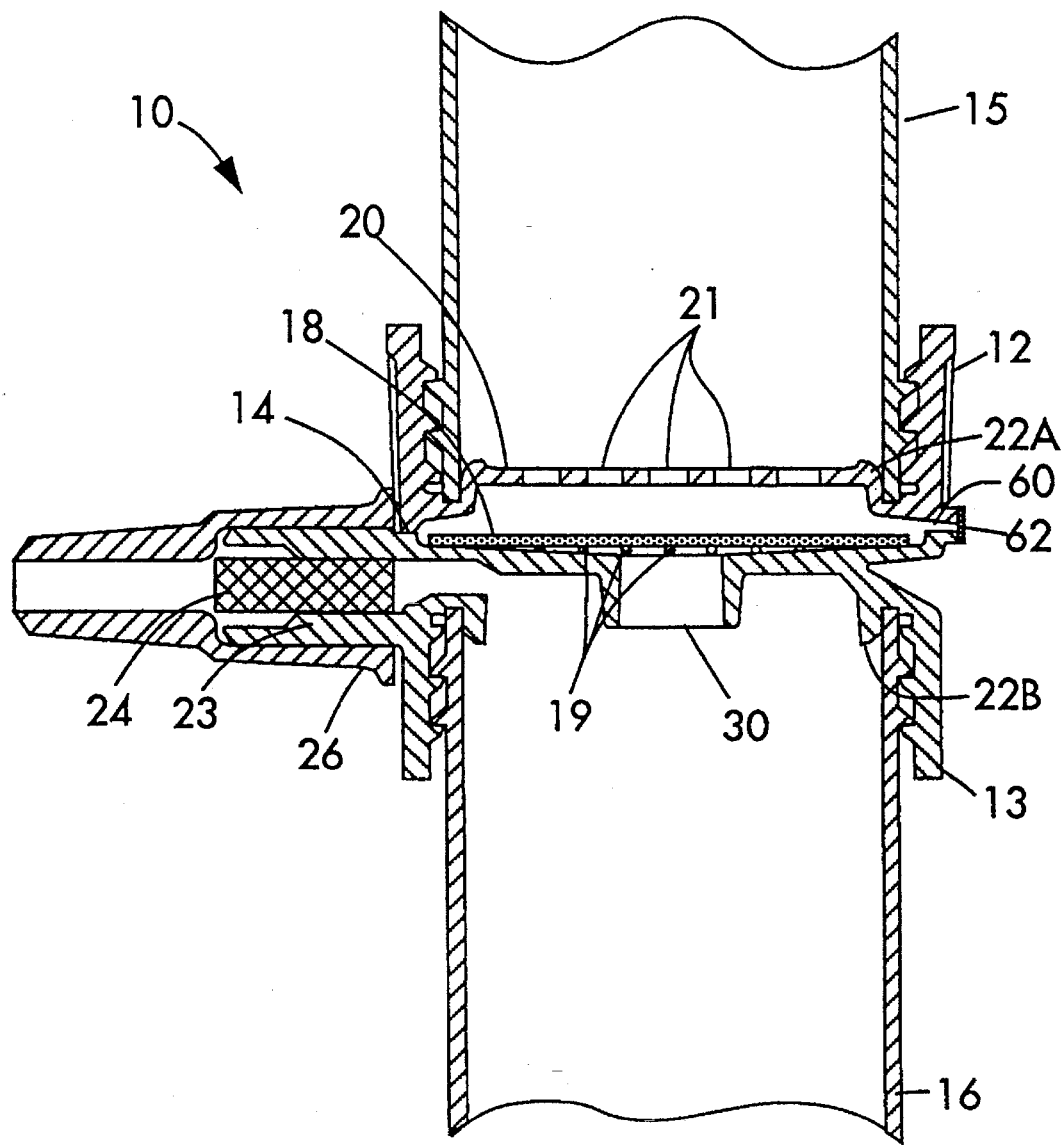
FIG. 6 is a sectional view of an alternate embodiment of a vacuum filter device in accordance with the invention.

FIG. 6 shows an alternate embodiment of the device 10 wherein like numerals refer to the same elements as those shown in FIG. 1. The construction and operation is similar to the FIG. 1 embodiment except the vent for the sample container 15 is a passageway 60 whose dimensions are compatible with those derived from conventional molding techniques (i.e. >0.015 inches). In this instance a hydrophobic membrane 62 covers the opening of the passageway 60 to keep sample solution from spilling out of as well as preventing microbes from entering the container 15. Thus when used with a sterilizing grade filter such as the aforementioned Express™ membrane, the filtration system of this embodiment represents a sterile, closed system which maintains the sterility of the solutions being processed.

Figure 7:
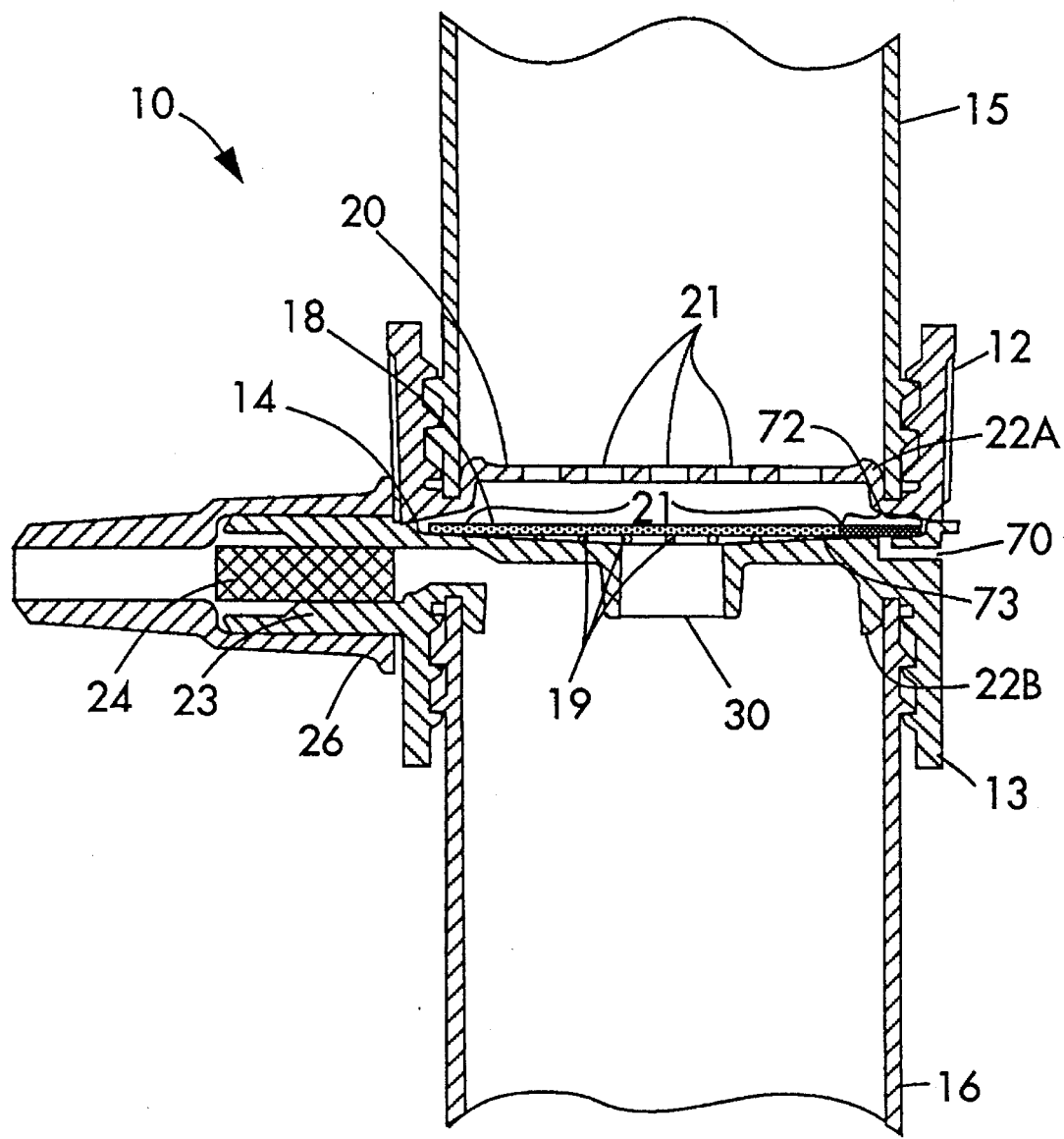
FIG. 7 is a sectional view of still another alternate embodiment of a vacuum filter device in accordance with the invention.

FIG. 7 shows still another embodiment similar to that of the FIG. 6 embodiment except that no vent membrane is used to cover passageway 70. Instead the membrane 18 includes both a hydrophilic region 71 which separates the two closed containers 15, 16 and a hydrophobic region 72 which is in direct fluid communication with the passageway 70. In this instance the membrane is also sealed to the face plate 17 at bonding point 73 in the vicinity of the interface between the hydrophilic and hydrophobic regions. To assure that the hydrophobic region forms an integral seal with the passageway, the membrane seal at point 73 must straddle both the hydrophilic and hydrophobic regions. As vacuum is drawn through the port 23, the sample solution will flow through the hydrophilic region of the membrane. At the same time air enters the passageway 70 and ultimately passes into the sample container 15 through the hydrophobic region of the membrane. This embodiment thus presents the same attributes of liquid-tight and sterile sealed filtration as that of the embodiment shown in FIG. 6.

Figure 8:
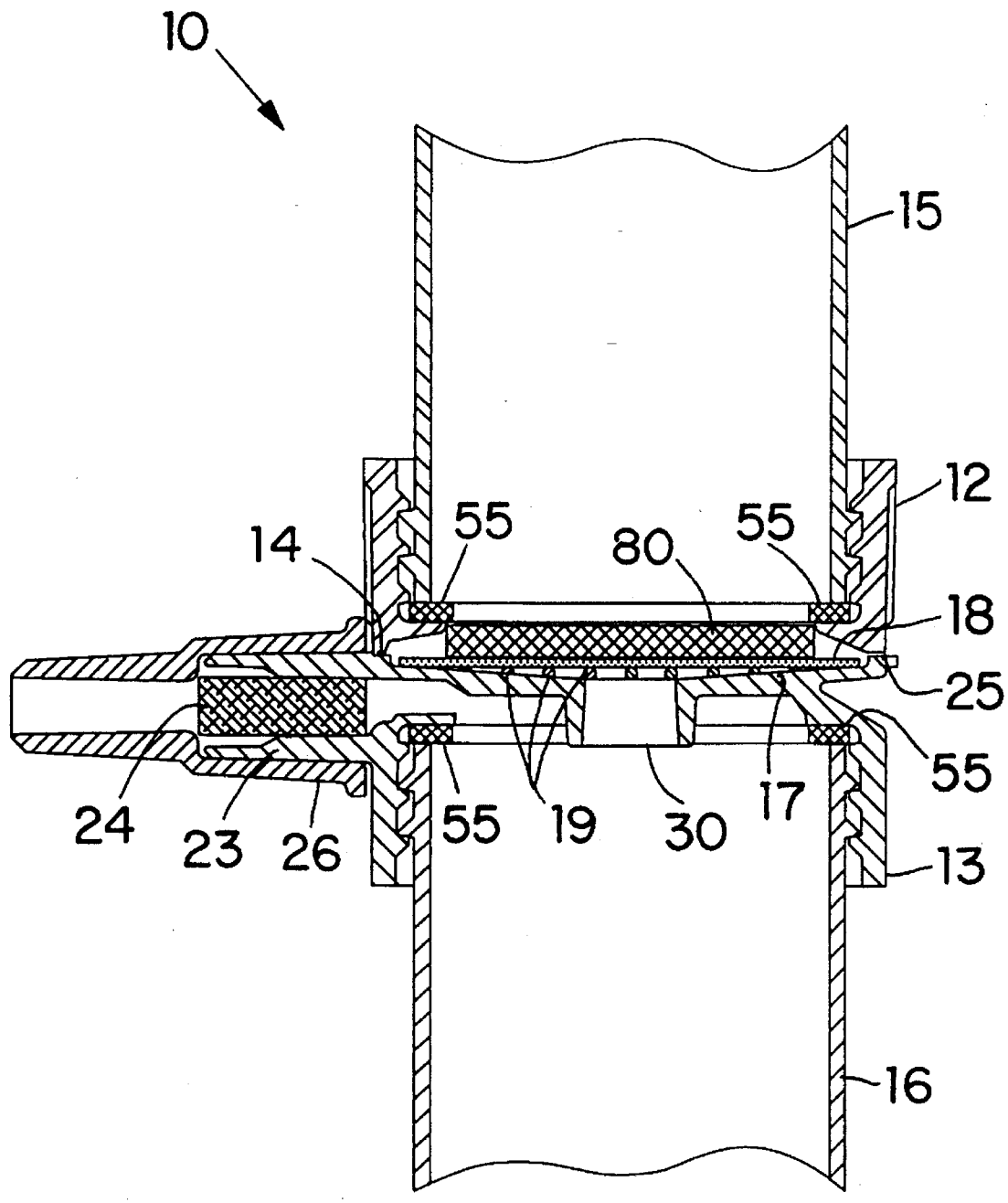
FIG. 8 is a sectional view of yet another alternate embodiment of a vacuum filter device in accordance with the invention.

FIG. 8 shows yet another embodiment of the invention similar to that of the FIG. 2 embodiment. In this embodiment, sealing is achieved through the elastomeric gasket 55 instead of the rings 22A, 22B. Also shown is the depth filter 80 in combination with the membrane 18. This depth filter functions as a prefilter matrix for the filtration device.

We claim:

1. A vacuum filter device comprising:

a single filter body having two holders disposed from one another, each of said holders adapted to receive respective feed and filtrate containers;

each of said holders including sealing means for creating a liquid and air tight seal when said containers are coupled to said filter body, said feed container for housing a liquid to be filtered and said filtrate container for receiving the filtered liquid, each of said containers forming liquid tight receptacles when coupled to said filter body;

a filter sealed within said filter body between said holders so that liquid in said feed container must pass through said filter prior to entering said filtrate container;

a vacuum port extending through said filter body and being in fluid communication with said filtrate container at a downstream side of said filter, said vacuum port adapted to be connected to a vacuum source for drawing said liquid from said feed container through said filter and into said filtrate container; and a vent passageway in said filter body configured to permit gas in the atmosphere surrounding said vacuum filter device to be in direct fluid communication with said feed container on an upstream side of said filter and not to be in direct fluid communication with said filtrate container.

2. The device of claim 1 wherein said filter body is of circular cross-section and said vent passageway extends through said filter body radially inward from the periphery of said filter body.

3. The device of claim 2 wherein said vent passageway is of circular cross-section and has a diameter of 0.015 inches or less.

4. The device of claim 2 wherein said vent passageway is of rectangular cross-section and the smallest dimension of said passageway is 0.015 inches or less.

5. The device of claim 1 wherein said filter is a microporous membrane.

6. The device of claim 1 wherein said filter is a depth filter.

7. The device of claim 1 wherein said filter is a combination of a microporous membrane and a depth filter.

8. The device of claim 1 including a hydrophobic membrane integrally sealing said vent passageway.

9. The device of claim 1 including a hydrophobic porous matrix positioned within said vent passageway.

10. The device of claim 1 including a hydrophobic tube positioned within said vent passageway.

11. The device of claim 1 wherein at least a portion of the surfaces of said vent passageway is hydrophobic.

12. The device of claim 1 wherein said filter is a microporous membrane which is segmented into hydrophilic and hydrophobic regions.

13. The device of claim 12 wherein said hydrophilic region separates said feed and filtrate containers and said hydrophobic region integrally seals said vent passageway.

14. The device of claim 1 wherein said filter body is of circular cross-section, said junctions are threaded holders axially disposed from each other and said and filtrate containers having mating threads for engaging said recess.

15. The device of claim 14 wherein said sealing means comprises a raised annular ring adapted to engage said feed and filtrate containers to form a compressive fit between said ring and the wall of said holders when said feed and filtrate containers are threaded therein.

16. The device of claim 14 wherein said sealing means comprises an elastomeric gasket positioned within the base of said holders.

17. The device of claim 1 including a prefilter matrix disposed upstream of said filter.

* * * * *